(12) United States Patent
Pei

(10) Patent No.: US 10,010,177 B1
(45) Date of Patent: Jul. 3, 2018

(54) SUPPORT FRAME OF PANEL TV SET

(71) Applicant: Xubo Pei, Shenzhen (CN)

(72) Inventor: Xubo Pei, Shenzhen (CN)

( * ) Notice: Subject to any disclaimer, the term of this patent is extended or adjusted under 35 U.S.C. 154(b) by 0 days.

(21) Appl. No.: 15/393,148

(22) Filed: Dec. 28, 2016

(51) Int. Cl.
| | |
|---|---|
| *A47F 5/00* | (2006.01) |
| *F16M 11/00* | (2006.01) |
| *F16M 13/00* | (2006.01) |
| *A47B 97/00* | (2006.01) |
| *F16M 13/02* | (2006.01) |

(52) U.S. Cl.
CPC ............ *A47B 97/001* (2013.01); *F16M 13/02* (2013.01); *F16M 2200/06* (2013.01)

(58) Field of Classification Search
USPC ......... 248/276.1, 278.1, 282.1, 274.1, 284.1, 248/281.11; 361/679.02, 679.06, 679.07
See application file for complete search history.

(56) References Cited

U.S. PATENT DOCUMENTS

| | | | | |
|---|---|---|---|---|
| 5,201,896 A * | 4/1993 | Kruszewski | ............ | F16M 11/10 248/278.1 |
| 5,400,991 A * | 3/1995 | Werner | ................ | F16M 11/08 248/230.4 |
| 6,863,252 B2 * | 3/2005 | Bosson | ................ | F16M 11/041 248/131 |
| D543,210 S * | 5/2007 | Stenhouse | ................ | D14/452 |
| 7,243,892 B2 * | 7/2007 | Pfister | ................ | F16M 11/10 248/281.11 |
| 7,264,212 B2 * | 9/2007 | Hung | ................ | F16M 11/10 248/184.1 |
| 7,380,760 B2 * | 6/2008 | Dittmer | ................ | F16M 11/041 248/278.1 |
| 7,448,584 B2 * | 11/2008 | Chen | ................ | F16M 11/10 248/122.1 |
| 7,513,469 B1 * | 4/2009 | Ciungan | ................ | F16M 11/046 248/161 |
| 7,641,163 B2 * | 1/2010 | O'Keene | ................ | F16M 11/10 248/284.1 |
| 7,832,700 B2 * | 11/2010 | Ciungan | ................ | F16M 11/10 248/281.11 |
| 7,905,460 B2 * | 3/2011 | Woods | ................ | F16M 11/10 248/220.21 |
| 8,028,964 B2 * | 10/2011 | Monaco | ................ | F16M 11/10 248/274.1 |
| 8,100,372 B2 * | 1/2012 | Vlies | ................ | F16M 11/10 248/220.1 |
| 8,136,776 B2 * | 3/2012 | Kim | ................ | F16M 11/10 248/291.1 |
| 8,561,955 B2 * | 10/2013 | Stemple | ................ | F16M 11/04 248/276.1 |
| 8,827,226 B2 * | 9/2014 | Townsend | ................ | F16M 11/10 220/3.5 |

(Continued)

*Primary Examiner* — Terrell L McKinnon
*Assistant Examiner* — Michael D McDuffie
(74) *Attorney, Agent, or Firm* — Novoclaims Patent Services LLC; Mei Lin Wong

(57) ABSTRACT

A support frame of a panel TV set comprises a wallboard (1), an upper main support arm (2), a lower main support arm (3), an auxiliary support arm (4), a small connector (5), a large connector (6), an adjusting handle (7), a connecting piece (8) and elongated bars (9), wherein the auxiliary support arm (4) can rotate relative to the upper main support arm (2) and the lower main support arm (3) by approximately 360-degrees, so as to achieve the design objectives.

1 Claim, 3 Drawing Sheets

(56) References Cited

U.S. PATENT DOCUMENTS

| | | | | |
|---|---|---|---|---|
| 8,870,140 B2* | 10/2014 | Stemple | ................ | F16M 11/04 |
| | | | | 248/276.1 |
| 2006/0261227 A1* | 11/2006 | Petrick | ................ | F16M 11/10 |
| | | | | 248/276.1 |
| 2007/0041150 A1* | 2/2007 | Short | ................ | F16M 11/10 |
| | | | | 361/679.22 |
| 2008/0258029 A1* | 10/2008 | Zhang | ................ | F16M 11/08 |
| | | | | 248/284.1 |
| 2009/0108158 A1* | 4/2009 | Kim | ................ | F16M 11/10 |
| | | | | 248/226.11 |
| 2009/0173860 A1* | 7/2009 | Remy | ................ | F16M 11/10 |
| | | | | 248/278.1 |
| 2013/0221174 A1* | 8/2013 | Sapper | ................ | F16M 11/2021 |
| | | | | 248/218.4 |

* cited by examiner

SUPPORT FRAME OF PANEL TV SET

BACKGROUND OF THE INVENTION

Technical Field

The present invention relates to a support frame of a panel TV set.

Description of Related Art

With the unceasing progress of science and technology, and the continuous improvement of living standards, the visual industry faces rapid development. For example, panel TV sets are getting popular by virtue of many advantages, such as small size and lightweight. When mounted, most panel TV sets need to be installed on a fixed bracket; however, the display technology of a panel TV sets varies from that of conventional electron tube TV sets, in that when watching TV programs, people need to face up to the screen of a panel TV set so as to achieve a good visual effect, especially for a LCD TV set. Therefore, there is an urgent need for a support frame used for angle adjustment of a panel TV set in a wide range to meet people's demands for a high-quality life.

BRIEF SUMMARY OF THE INVENTION

The objective of the present invention is to provide a support frame of a panel TV set which is simple in structure and can rotate in a wider range of angles so as to solve the above problems.

The present invention adopts the following technical solution:

The present invention comprises a wallboard, an upper main support arm, a lower main support arm, an auxiliary support arm, a small connector, a large connector, an adjusting handle, a connecting piece and elongated bars, wherein the wallboard is formed with an upper support slot, a lower support slot, an upper positioning hole and a lower positioning hole; both ends of the upper main support arm are formed with through-holes, and the lower main support arm and the upper main support arm are structurally identical; both ends of the auxiliary support arm are formed with through-holes; the rear part of the small connector is formed with symmetrically-provided upper and lower holes, with its upper and lower parts both formed with symmetrically-provided left and right holes; the upper part of the large connector is formed with an adjusting slot, and the lower part is formed with a connecting hole and a positioning slot; the connecting piece is formed with four angles, and four elongated bars are provided, characterized in that, one end of the upper main support arm is movably connected via a screw rod and the upper support slot of the wallboard, one end of the lower main support arm is movably connected via a screw rod and the lower support slot of the wallboard; one end of the auxiliary support arm is mounted on a gap formed between the other end of the upper main support arm and the other end of the lower main support arm and movably connected via a screw rod, the other end of the auxiliary support arm is movably connected via a screw rod and the upper and lower holes symmetrically provided in the rear part of the small connector; the adjusting handle passes through the adjusting slot of the large connector and the left and right holes symmetrically provided in the upper part of the small connector so as to connect the large connector and the small connector; the lower part of the large connector is connected with the lower part of the small connector via a screw rod, the connecting piece is fixedly connected with the lower part of the large connector via a screw rod and the elongated bars are respectively connected with four angles of the connecting piece via screws, so that it can achieve the design objectives.

In use, the wallboard is fixed to a fixed support such as a wall surface via screws, and a panel TV set is fixed to the elongated bars; the upper and lower main support arms can rotate relative to the wallboard, the auxiliary support arm can rotate relative to the upper and lower main support arms, the small connector can rotate relative to the auxiliary support arm, and the large connector can rotate relative to the small connector by a certain angle ups and downs via the adjusting handle, so that it can achieve the design objectives.

The advantages of the present invention are as below:

1. The implementation of the present invention with a simple structure can realize the adjustment of angles in a wider range to facilitate people's viewing angles.

BRIEF DESCRIPTION OF THE SEVERAL VIEWS OF THE DRAWINGS

The present invention is further detailed in combination with the drawings as below.

In the figures, 1—wallboard, 11—upper support slot, 12—lower support slot, 13—upper positioning hole, 14—lower positioning hole, 2—upper main support arm, 3—lower main support arm, 4—auxiliary support arm, 5—small connector, 6—large connector, 7—adjusting handle, 8—connecting piece, 9—elongated bars, 10—column.

DETAILED DESCRIPTION OF THE INVENTION

Figure 1:
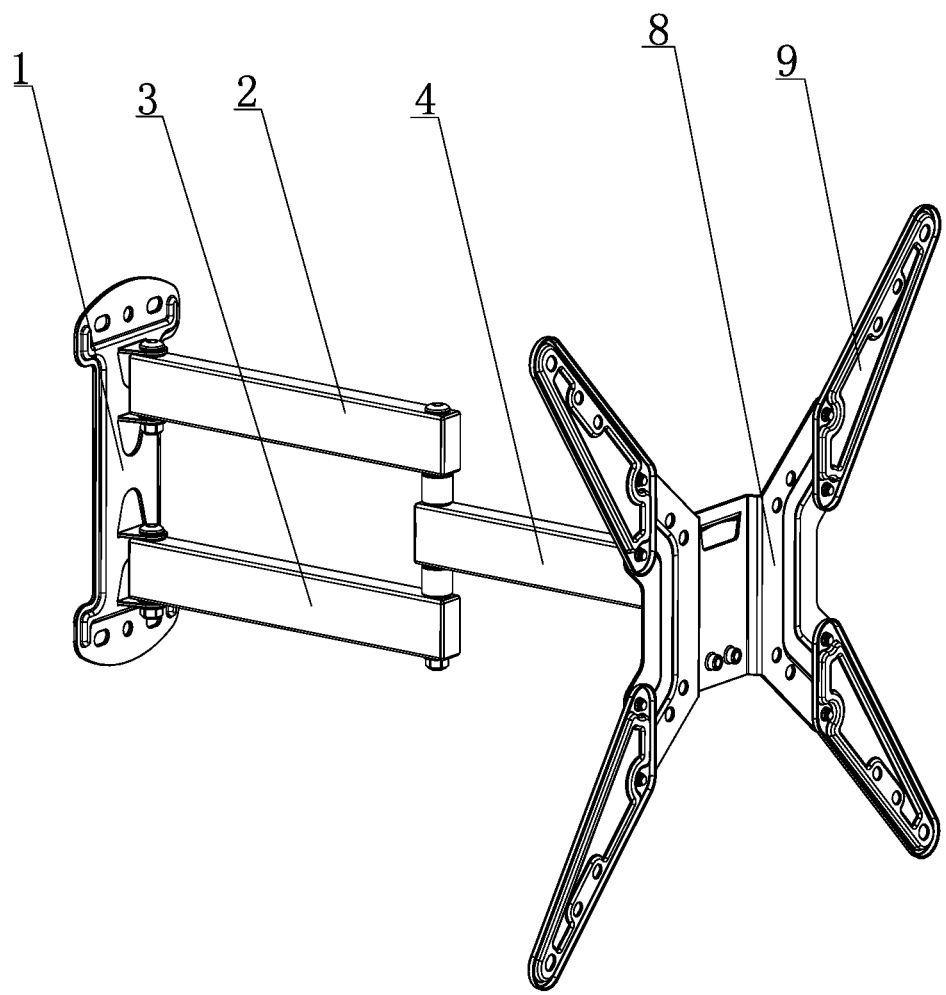
FIG. 1 is a structural diagram of the present invention.
Figure 2:
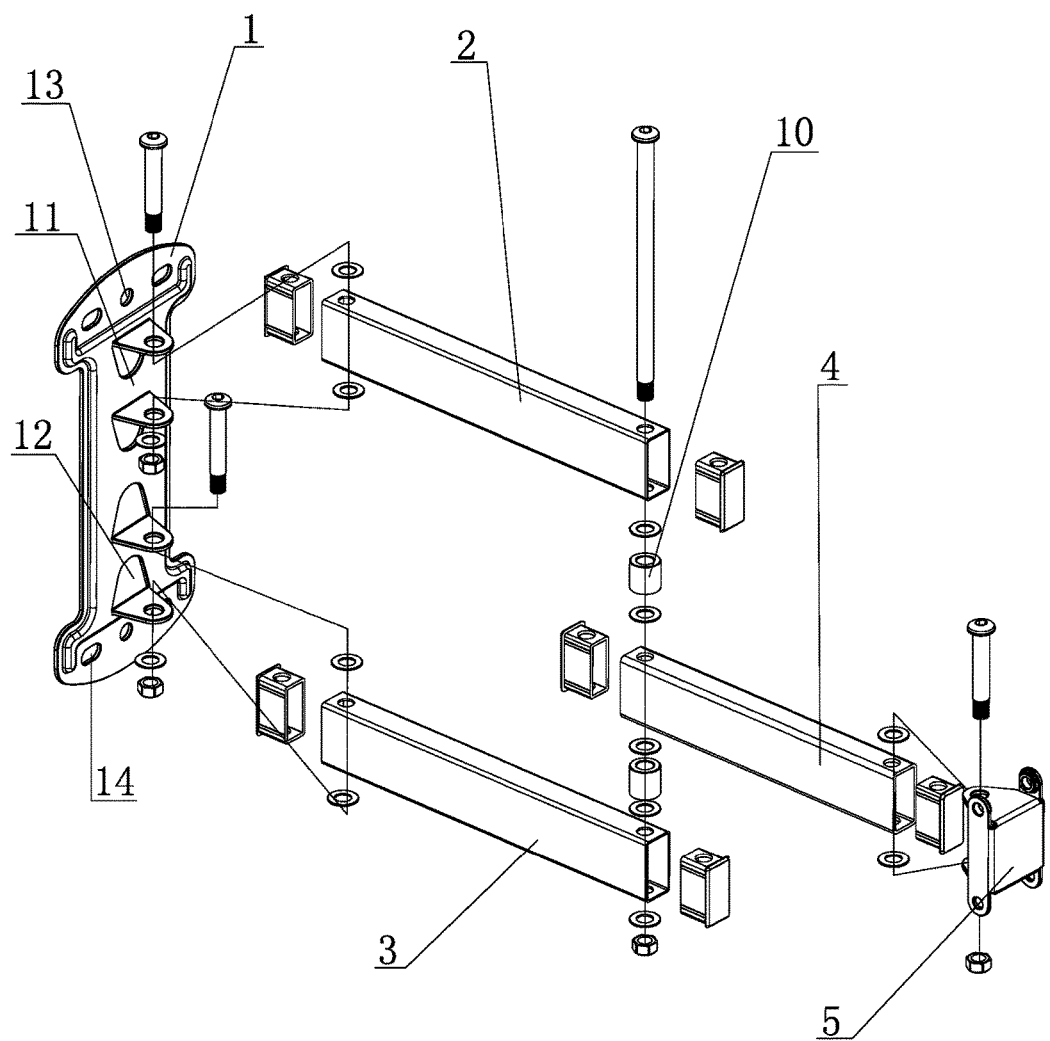
FIG. 2 is a breakdown structure diagram of the upper main support arm, the lower support arm and the auxiliary support arm of the present invention.
Figure 3:
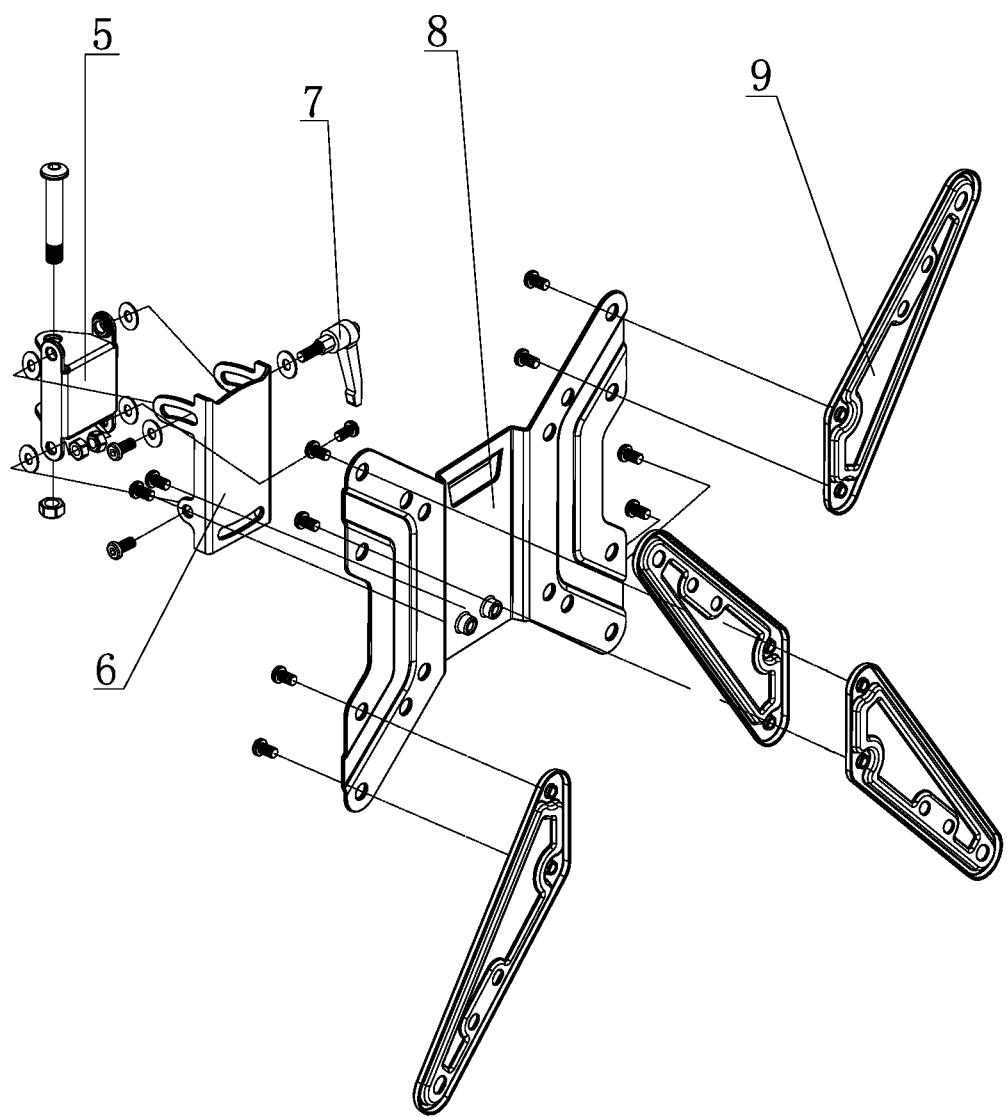
FIG. 3 is a breakdown structure diagram of the small connector and the large connector of the present invention.

As shown in FIG. 1-FIG. 3, the present invention of a support frame of a panel TV set comprises a wallboard 1, an upper main support arm 2, a lower main support arm 3, an auxiliary support arm 4, a small connector 5, a large connector 6, an adjusting handle 7, a connecting piece 8 and elongated bars 9, wherein the wallboard 1 is formed with an upper support slot 11, a lower support slot 12, an upper positioning hole 13 and a lower positioning hole 14; both ends of the upper main support arm 2 are formed with through-holes, and the lower main support arm 3 and the upper main support arm 2 are structurally identical; both ends of the auxiliary support arm 4 are formed with through-holes; the rear part of the small connector 5 is formed with symmetrically-provided upper and lower holes, with its upper and lower parts both formed with symmetrically-provided left and right holes; the upper part of the large connector 6 is formed with an adjusting slot, and the lower part is formed with a connecting hole and a positioning slot; the connecting piece is formed with four angles, and four elongated bars are provided, characterized in that, one end of the upper main support arm 2 is movably connected via a screw rod and the upper support slot 11 of the wallboard 1, one end of the lower main support arm 3 is movably connected via a screw rod and the lower support slot 12 of the wallboard 1; one end of the auxiliary support arm 4 is mounted on a gap formed between the other end of the upper main support arm 2 and the other end of the lower main support arm 3 and movably connected via a screw rod, wherein a column 10 is provided for positioning, the other end of the auxiliary support arm 4 is movably connected via a screw rod and the upper and lower holes symmetrically provided in the rear part of the small connector 5; the adjusting handle 7 passes through the adjusting slot of the large connector 6 and the left and right holes symmetrically provided in the upper part of the small connector 5 so as to connect the large connector 6 and the small connector 5; the lower part of the large connector 6 is connected with the lower part of the small connector 5 via a screw rod, the connecting piece 8 is fixedly connected with the lower part of the large connector 6 via a screw rod and the elongated bars 9 are respectively connected with four angles of the connecting piece 8 via screws, wherein when the wallboard 1 is fixed to the fixed support such as a wall surface by a screw and a panel TV set is fixed to the elongated bars 9, the upper main support arm 2 and the lower main support arm 3 can rotate relative to the wallboard 1 by 180 degrees to both left and right sides, the auxiliary support arm 4 can rotate relative to the upper main support arm 2 and the lower main support arm 3 by approximately 360-degrees, the small connector 5 can rotate relative to the auxiliary support arm 4 by 180 degrees, and the large connector 6 can rotate relative to the small connector 5 via the adjusting handle 7 by a certain angle ups and downs, so that it can achieve the design objectives.

Widely applied in the field of support frame of panel TV set, the present invention with a simple structure can realize the adjustment of angles in a wider range.

What is claimed is:

1. A support frame of a panel TV set, comprising a wallboard, an upper main support arm, a lower main support arm, an auxiliary support arm, a small connector, a large connector, an adjusting handle, a connecting piece and elongated bars, wherein the wallboard is formed with an upper support slot, a lower support slot, an upper positioning hole and a lower positioning hole, both ends of the upper main support arm are formed with through-holes, and the lower main support arm and the upper main support arm are structurally identical; both ends of the auxiliary support arm are formed with through-holes; the rear part of the small connector is formed with symmetrically-provided upper and lower holes, with its upper and lower parts both formed with symmetrically-provided left and right holes; the upper part of the large connector is formed with an adjusting slot, and the lower part is formed with a connecting hole and a positioning slot; the connecting piece is formed with four angles, and four elongated bars are provided, characterized in that, one end of the upper main support arm is movably connected via a screw rod and the upper support slot of the wallboard, one end of the lower main support arm is movably connected via a screw rod and the lower support slot of the wallboard, one end of the auxiliary support arm is mounted on a gap formed between the other end of the upper main support arm and the other end of the lower main support arm and movably connected via a screw rod, wherein a column is provided for positioning, the other end of the auxiliary support arm is movably connected via a screw rod and the upper and lower holes symmetrically provided in the rear part of the small connector, the adjusting handle passes through the adjusting slot of the large connector and the left and right holes symmetrically provided in the upper part of the small connector so as to connect the large connector and the small connector, the lower part of the large connector is connected with the lower part of the small connector via a screw rod, the connecting piece is fixedly connected with the lower part of the large connector via a screw rod and the elongated bars are respectively connected with four angles of the connecting piece via screws.

* * * * *